(12) United States Patent
Saeki

(10) Patent No.: US 6,988,763 B2
(45) Date of Patent: Jan. 24, 2006

(54) VEHICLE BODY SIDE STRUCTURE

(75) Inventor: Hidetsugu Saeki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/902,782

(22) Filed: Aug. 2, 2004

(65) Prior Publication Data

US 2005/0046233 A1 Mar. 3, 2005

(30) Foreign Application Priority Data

Sep. 3, 2003 (JP) .............................. 2003-311086

(51) Int. Cl.
*B60K 7/00* (2006.01)
(52) U.S. Cl. ............................ 296/187.12; 296/187.03; 296/203.03
(58) Field of Classification Search ........... 296/187.12, 296/187.03, 193.05, 203.02, 196.06, 209
See application file for complete search history.

(56) References Cited

U.S. PATENT DOCUMENTS

| | | | | |
|---|---|---|---|---|
| 5,246,264 A | * | 9/1993 | Yoshii | 296/187.12 |
| 5,382,071 A | * | 1/1995 | Enning et al. | 296/187.12 |
| 5,810,428 A | * | 9/1998 | Maki | 296/187.05 |
| 6,073,992 A | * | 6/2000 | Yamauchi et al. | 296/187.12 |
| 6,179,370 B1 | * | 1/2001 | Takeuchi | 296/187.12 |
| 6,299,239 B1 | * | 10/2001 | Sagawa et al. | 296/187.12 |
| 6,322,135 B1 | * | 11/2001 | Okana et al. | 296/203.03 |
| 6,332,643 B1 | * | 12/2001 | Sukegawa et al. | 296/203.03 |
| 6,474,726 B1 | * | 11/2002 | Hanakawa et al. | 296/187.12 |
| 6,607,239 B1 | * | 8/2003 | Fuji | 296/203.03 |
| 6,705,668 B1 | * | 3/2004 | Makita et al. | 296/187.03 |
| 6,817,654 B2 | * | 11/2004 | Kitagawa et al. | 296/187.12 |
| 6,854,795 B2 | * | 2/2005 | Yamazaki et al. | 296/187.12 |
| 2002/0043821 A1 | * | 4/2002 | Takashina et al. | 296/203.03 |
| 2004/0201253 A1 | * | 10/2004 | Kitagawa et al. | 296/187.03 |
| 2005/0023862 A1 | * | 2/2005 | Saeki | 296/187.12 |
| 2005/0151363 A1 | * | 7/2005 | Saeki | 280/784 |
| 2005/0189790 A1 | * | 9/2005 | Chernoff et al. | 296/193.05 |

FOREIGN PATENT DOCUMENTS

JP 2002-347655 A 12/2002

* cited by examiner

*Primary Examiner*—Kiran B. Patel
(74) *Attorney, Agent, or Firm*—Shinjyu Global IP Counselors, LLP

(57) ABSTRACT

The vehicle body side structure is provided that comprises a front pillar, a center pillar, a rear pillar, a side sill, a roof side rail, and front and rear strengthening members. The center pillar further comprises an inner pillar member or portion coupled to the roof side rail and the side sill and an outer pillar member or portion disposed on the transversely outward side of the inner pillar member. The outer pillar member is coupled to the side sill a vertically approximate center portion of the inner pillar member. A main energy absorbing section is provided at a lower end portion of the outer pillar member. The front and rear strengthening members are coupled only to the outer pillar member of the center pillars. As a result, a load input during a side collision is dispersed and transmitted through the strengthening members and through the inner pillar member.

19 Claims, 15 Drawing Sheets

VEHICLE BODY SIDE STRUCTURE

BACKGROUND OF THE INVENTION

1. Field of the Invention

The present invention relates to a vehicle body side structure for an automobile or the like. More particularly, the present invention relates to a side structure for a vehicle body that basically comprises a front pillar, a center pillar, and a rear pillar.

2. Background Information

One example of a conventional vehicle body side structure is presented in Japanese Laid-Open Patent Publication No. 2002-347655. The vehicle body side structure disclosed in the above mentioned reference has a reinforcement member (beltline reinforcement) provided inside a main body of each door along the beltline of the vehicle and also has an additional reinforcement member (impact beam) provided inside the main body of each door. As a result, with the conventional vehicle body side structure, a deformation of the main body of each door to bulge inwardly toward a cabin of the vehicle is suppressed during a side collision.

In view of the above, it will be apparent to those skilled in the art from this disclosure that there exists a need for an improved vehicle body side structure. This invention addresses this need in the art as well as other needs, which will become apparent to those skilled in the art from this disclosure.

SUMMARY OF THE INVENTION

In the conventional vehicle body side structure disclosed in the above mentioned reference, the reinforcement members (the beltline reinforcement and the impact beam) are provided in a main body of a door to reinforce the door. When the reinforcement members are disposed both in the front and rear doors, the reinforced front and rear doors are typically mounted on front and rear sides of the center pillar, respectively.

When the vehicle body side structure is strengthened against side collisions by merely reinforcing the front door and the rear door as in the conventional vehicle body side structure described in the above mentioned reference, forces imparted to the doors during a side collision tend to be transmitted substantially to the center pillar. Particularly in case of a side collision in which no force is imparted directly to the side sill, the collision load is substantially concentrated at the center pillar.

Consequently, the strength of the center pillar is required to be greatly increased. As a result, the weight of the center pillar, and thus the weight of the vehicle body, will increase to reinforce the center pillar by increasing the thickness of the center pillar and/or attaching reinforcement members to the center pillar.

In view of the above, one object of the present invention is to effectively reduce the transversely inward deformation of the vehicle body side structure incurred during a side collision without greatly increasing the weight of the vehicle body by providing a vehicle body side structure having load transmission paths configured to disperse the side collision input load.

In order to achieve the above mentioned and other object of the present invention, a vehicle body side structure is provided that comprises an upper structural portion, a lower structural portion, an inner center pillar portion, an outer center pillar portion, a front strengthening member, and a rear strengthening member. The upper structural portion extends in a generally longitudinal direction of the vehicle body side structure. The lower structural portion extends in a generally longitudinal direction of the vehicle body side structure. The inner center pillar portion is rigidly coupled between the upper and lower structural portions and extends in a generally vertical direction of the vehicle body side structure. The outer center pillar portion has an upper end rigidly coupled to the inner center pillar portion at a location spaced downwardly from the upper structural portion and a lower end rigidly coupled to the lower structural portion such that the outer center pillar portion is disposed on a transversely outward side of the inner center pillar portion. The outer center pillar portion is configured and arranged to form a main energy absorbing section that is displaceable in a transverse direction of the vehicle body side structure relative to the inner center pillar portion such that after the main energy absorbing section deforms during application of a side input load. The side input load is transmitted in generally in the vertical direction along the inner center pillar portion to the upper and lower structural portions. The front strengthening member is operatively coupled to the outer center pillar portion such that the side input load is at least initially transmitted longitudinally along the front strengthening member. The rear strengthening member is operatively coupled to the outer center pillar portion such that the side input load is at least initially transmitted longitudinally along the rear strengthening member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
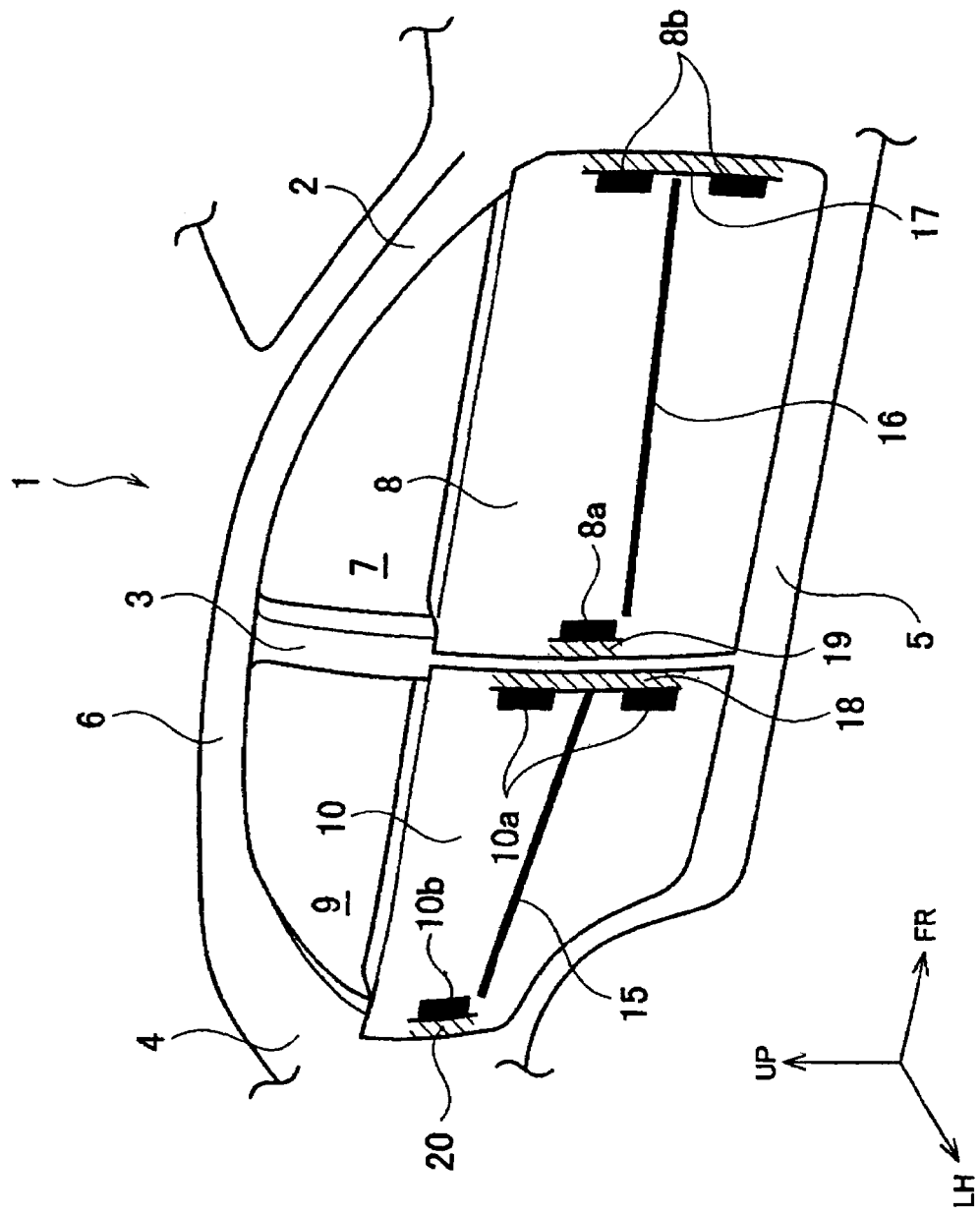
FIG. 1 is a perspective view of a vehicle body side structure in accordance with a first embodiment of the present invention.

Referring initially to FIGS. 1–9, a vehicle body side structure utilized in a vehicle 1 is illustrated in accordance with a first embodiment of the present invention. FIG. 1 is a perspective view illustrating main components of the vehicle body side structure in accordance with the first embodiment of the present invention. As shown in FIG. 1, the vehicle body side structure of the first embodiment is utilized in the vehicle 1 and basically comprises a pair of front pillars 2 (only one shown), a pair of center pillars 3 (only one shown), a pair of rear pillars 4 (only one shown), a pair of side sills 5 (only one shown) and a pair of roof side rails 6 (only one shown). Also, the vehicle body side structure of the first embodiment includes a pair of front doors 8 (only one shown) and a pair of rear doors 10 (only one shown). It will be apparent to those skilled in the art from this disclosure that each one of the front pillars 2, the center pillars 3, the rear pillars 4, the side sills 5, the roof side rails 6, the front doors 8 and the rear doors 10 are disposed on each transverse side (left or right side) of the vehicle 1 to form the vehicle body side structures in the same manner, except that they are mirror images of each other. Therefore, only one transverse side (i.e., right side) of the vehicle body side structure will be discussed and illustrated in detail herein. Furthermore, it will be apparent to those skilled in the art from this disclosure that the vehicle body side structure of the present invention is not limited to be utilized in both sides of the vehicle 1. For example, the vehicle body side structure of the present invention can be applied to only one transverse side of the vehicle when each transverse side of the vehicle is not symmetrical to each other and the like.

As seen in FIG. 1, the front pillar 2 is configured to extend in a generally vertical direction with respect to the vehicle 1 and arranged on a transverse side of a front portion of a vehicle body. The center pillar 3 is configured to extend in a generally vertical direction with respect to the vehicle 1 and arranged on the transverse side of a longitudinally approximate center portion of the vehicle body. The rear pillar 4 is configured to extend in a generally vertical direction with respect to the vehicle 1 and arranged on the transverse side of a rear portion of the vehicle body. The side sill 5 is configured to extend in the longitudinal direction of the vehicle body to couple lower end portions of the front pillar 2, the center pillar 3 and the rear pillar 4. The roof side rail 6 is configured extend in the longitudinal direction of the vehicle body and to connect upper end portions of the front pillar 2, the center pillar 3 and the rear pillar 4.

As seen in FIG. 1, the front door 8 is installed in an opening 7, which is formed by the front pillar 2, the center pillar 3, the side sill 5, and the roof side rail 6. The rear door 10 is installed in an opening 9, which is formed by the center pillar 3, the rear pillar 4, the side sill 5, and the roof side rail 6.

The front door 8 preferably constitutes a front connecting/strengthening member that is arranged between the front pillar 2 and the center pillar 3 to support an area formed between the front pillar 2 and the center pillar 3. The rear door 10 preferably constitutes a rear connecting/strengthening member arranged between the center pillar 3 and the rear pillar 4 to support an area between the center pillar 3 and the rear pillar 4. Moreover, the front door 8 and the rear door 10 are preferably provided with a front guard bar 15 and a rear guard bar 16, respectively, that are oriented in the longitudinal direction of the vehicle body to reinforce the front door 8 and the rear door 10, respectively.

Figure 2:
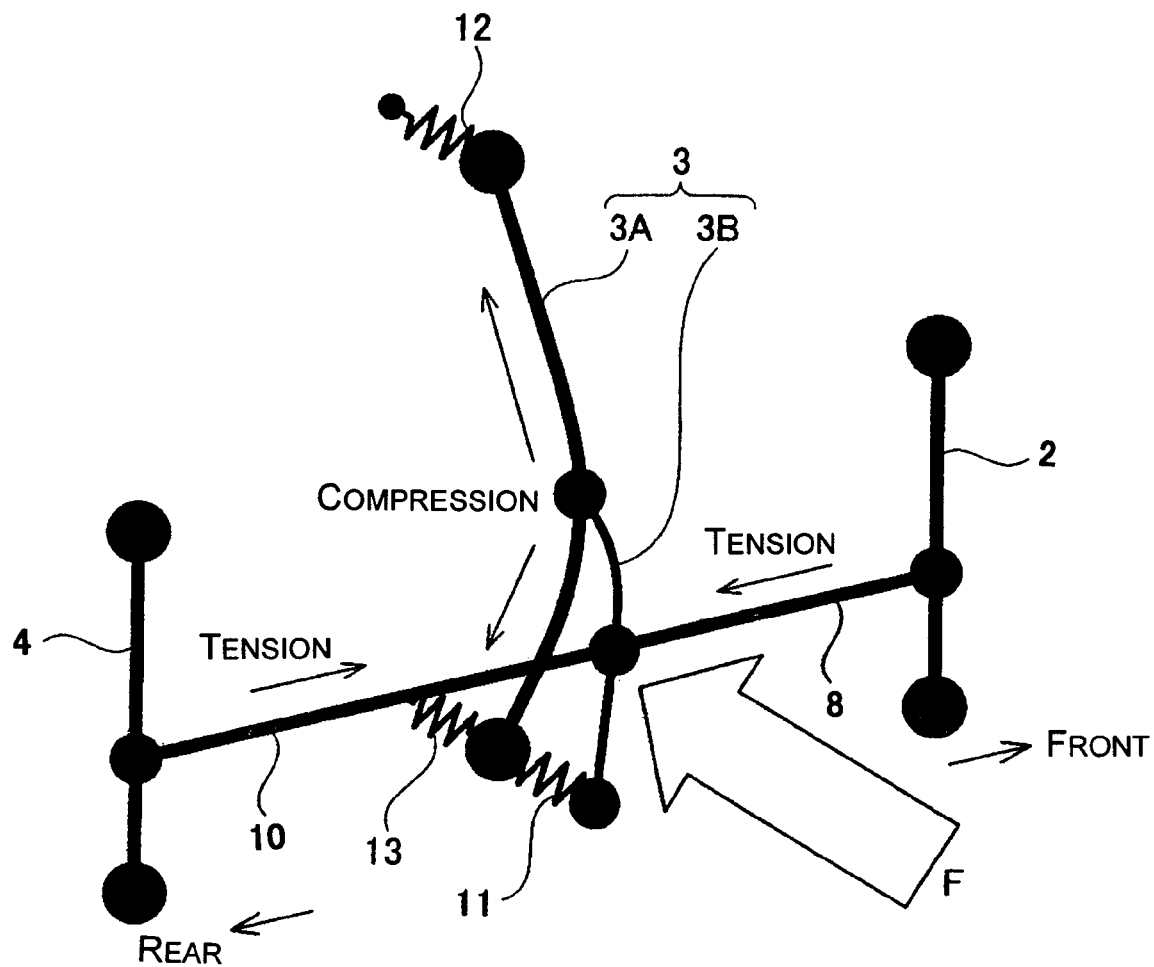
FIG. 2 is a schematic diagram illustrating a basic concept of load transmission paths during a side collision in the vehicle body side structure in accordance with the first embodiment of the present invention.

FIG. 2 is a schematic diagram illustrating a basic concept of load transmission paths during a side collision in the vehicle body side structure in accordance with the first embodiment of the present invention. As seen in FIG. 2, with the vehicle body side structure of the first embodiment, when a collision load F is imparted to the front door 8 and the rear door 10 due to a side collision, the front door 8 and the rear door 10 are configured and arranged to transmit the input load to the vehicle body side structure by supporting tensile forces between the front pillar 2 and the center pillar 3 and between the center pillar 3 and the rear pillar 4.

Since the front door 8 and the rear door 10 includes the front guard bar 15 and the rear guard bar 16, respectively, arranged to be substantially perpendicular to the direction of the load input during the initial stage of a collision, the tension components carried by the front door 8 and the rear door 10 increase as the center pillar 3 moves inwardly in the transverse direction of the vehicle 1. Thus, the load transmission efficiency can be increased.

Moreover, with the vehicle body side structure of the first embodiment, the displacement of the center pillar 3 can be absorbed by a main energy absorbing section 11 formed on the lower end portion of an outer pillar member or portion 3B, as explained in more detail below. Therefore, the degree to which the load is transmitted from the front door 8 and the rear door 10 to an inner pillar member or portion 3A can be reduced effectively.

As a result, two load transmission paths are formed with respect to the load input of a side collision. In other words, the load is transmitted through the front door 8 and the rear door 10, and through the inner pillar member 3A, which is substantially independently of the front door 8 and the rear door 10. Thus, the input load can be dispersed efficiently among a plurality of members of the vehicle body side structure, and the load input from being concentrated in a specific member can be prevented. Accordingly, the vehicle body side structure of the first embodiment enables sufficient vehicle body strength to be secured with a smaller increase in weight.

Figure 3:
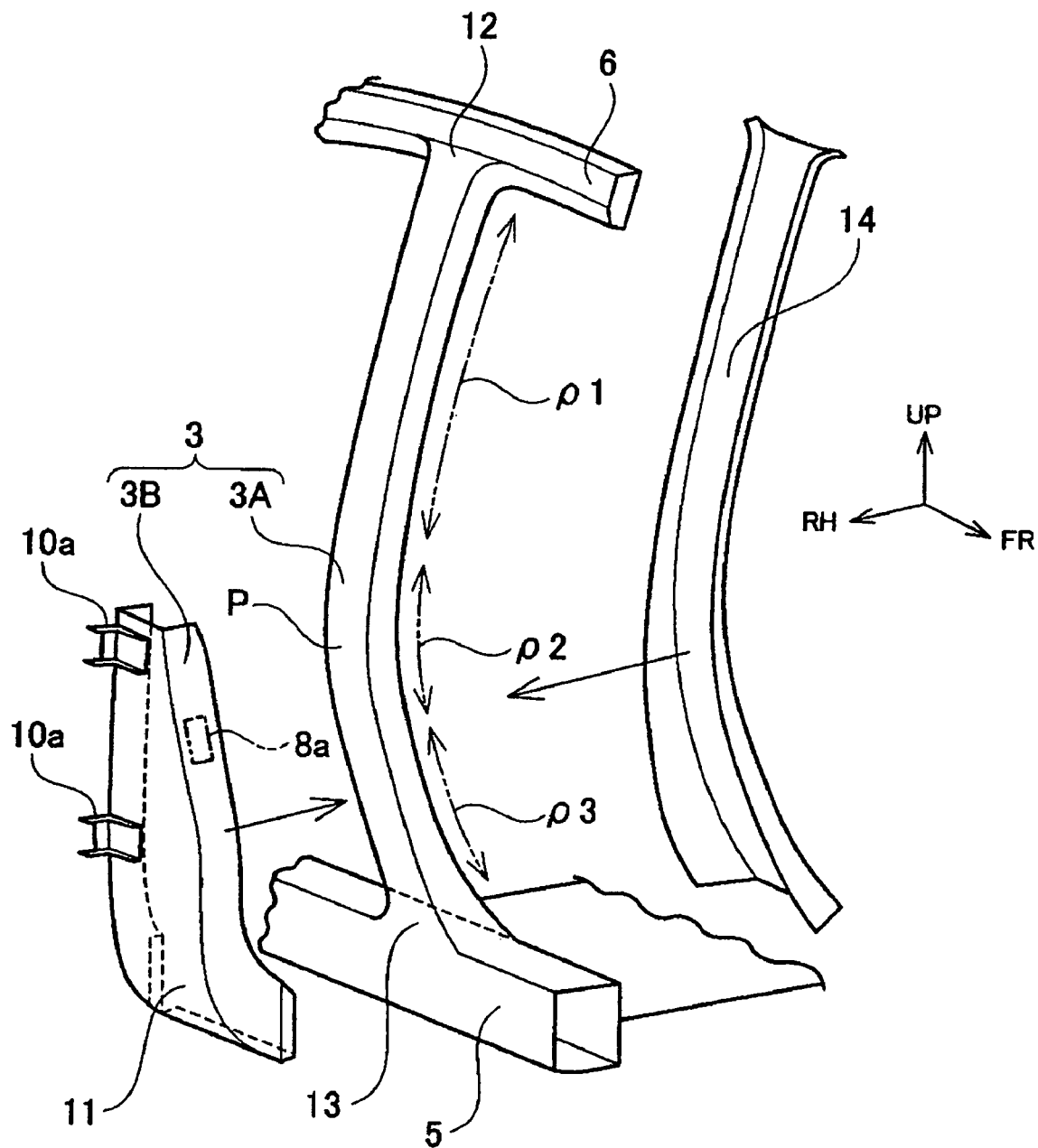
FIG. 3 is an exploded perspective view of a center pillar of the vehicle body side structure in accordance with the first embodiment of the present invention.

FIG. 3 is an exploded perspective view of the center pillar 3. As shown in FIG. 3, in the first embodiment of the present invention, the center pillar 3 preferably comprises the inner pillar member 3A and the outer pillar member 3B. The inner pillar member 3A is coupled to the roof side rail 6 and the side sill 5 to extend therebetween. The outer pillar member 3B is arranged on the transversely outward facing side of the inner pillar member 3A. The outer pillar member 3B is preferably coupled to the side sill 5 and a vertically approximate center portion of the inner pillar member 3A to extend therebetween.

Figure 4:
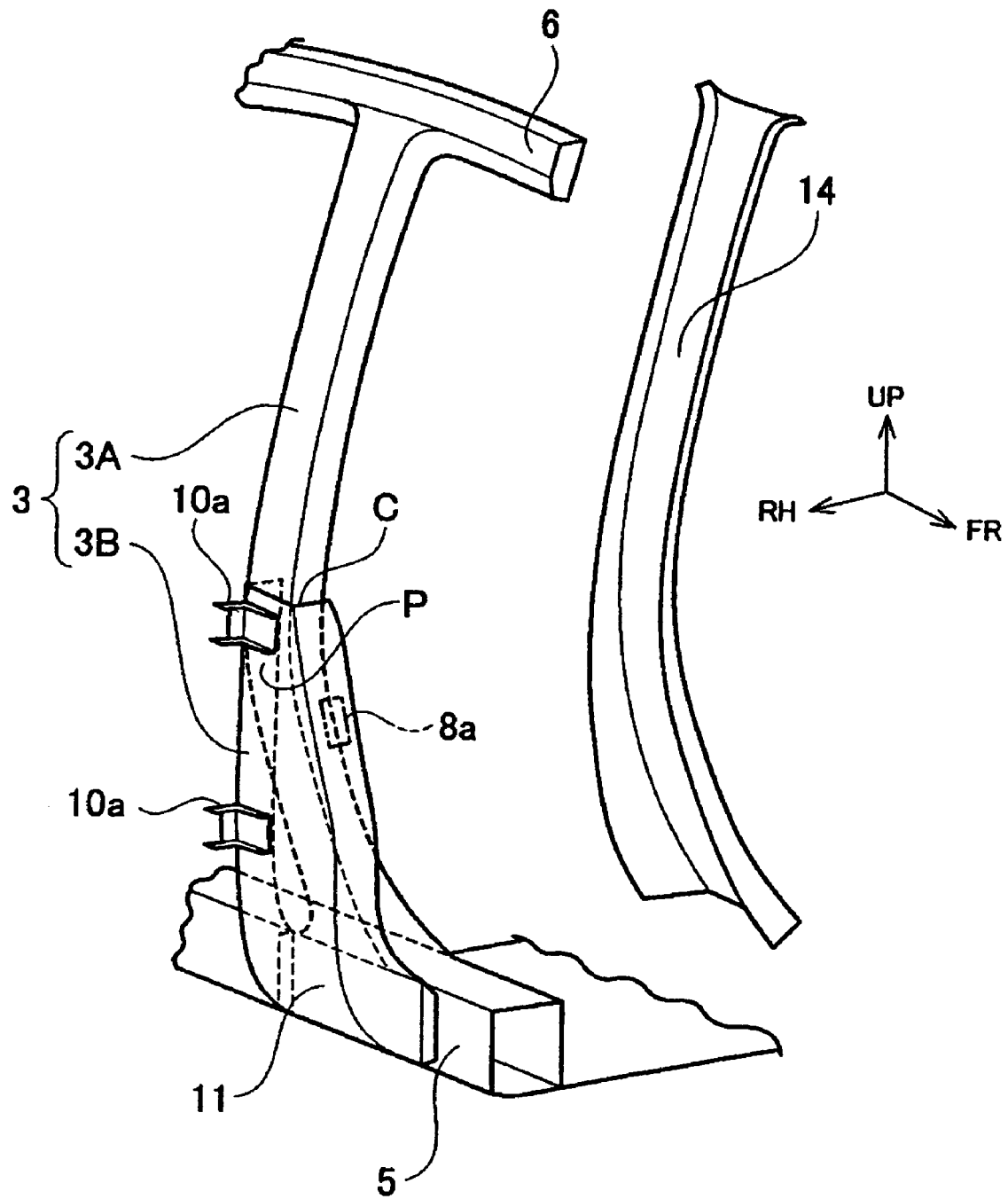
FIG. 4 is a partially exploded perspective view of the center pillar of the vehicle body side structure in accordance with the first embodiment of the present invention.

As seen in FIG. 3, in the first embodiment of the present invention, the vertical length of the outer pillar member 3B is preferably approximately one-half of the vertical length of the inner pillar member 3A. FIG. 4 shows a partially exploded perspective view of the center pillar 3 in which the inner pillar member 3A and the outer pillar member 3B are coupled together. As shown in FIG. 4, an upper terminal end portion of the outer pillar member 3B is preferably coupled to the outer surface of the inner pillar member 3A with an uninterrupted weld oriented in the girth-wise direction of the inner pillar member 3A. The lower end portion of the outer pillar member 3B is preferably coupled in an abutted manner to the outer surface of the side sill 5. As explained above, the outer pillar member 3B preferably include the main energy absorbing section 11 that is configured and arranged to allow the outer pillar member 3B to undergo displacement in the transverse direction of the vehicle 1 at a portion where the lower end portion of the outer pillar member 3B is coupled to the side sill 5 in response to an input of a side collision load.

Referring back to FIG. 1, the front door 8 preferably includes a lock mechanism 8a at a rear portion thereof. The rear door 10 preferably includes two hinges 10a that are configured to pivotally couple the rear door 10 to the center pillar 3 at the front end portion of the rear door 10. In the first embodiment of the present invention, the rear end portion of the front door 8 (where the lock mechanism 8a is provided) and the front end portion of the rear door 10 (where the hinge 10a is provided) are preferably configured to be coupled only to and supported only by the outer pillar member 3B of the center pillar 3 as seen in FIG. 3.

Additionally, as seen in FIG. 2, subordinate energy absorbing sections 12 and 13 are preferably formed at portions of the vehicle body side structure where the inner pillar member 3A is coupled to the side sill 5 and the roof side rail 6, respectively. The subordinate energy absorbing sections 12 and 13 are configured and arranged to allow the inner pillar member 3A to undergo displacement in the transversely inward direction of the vehicle 1 in response to a side collision load. In other words, the subordinate energy absorbing sections 12 and 13 are configured and arranged such that the upper and lower end portions of the inner pillar member 3A at least initially deform primarily relative to the center portion of the inner pillar member 3A during a side collision load. Moreover, the subordinate energy absorbing sections 12 and 13 and the main energy absorbing section 11 are preferably configured and arranged such that the reaction force characteristics of the subordinate energy absorbing sections 12 and 13 are larger than the reaction force characteristic of the main energy absorbing section 11. Therefore, the main energy absorbing section 11 of the outer pillar member 3B alone can be made to deform with certainty in the initial stage of a side collision when the portions of the front door 8 and the rear door 10 that are connected to the outer pillar member 3B undergo displacement toward the inside of the cabin. In other words, the subordinate energy absorbing sections 12 and 13 are configured and arranged to primarily deform after the main energy absorbing section 11 has substantially completely deformed into contact with the lower portion of the inner pillar member 3A.

As shown in FIGS. 3 and 4, the outer pillar member 3B is preferably made by press forming a panel material to obtain a hat-shaped cross section, i.e., a generally U-shaped cross sectional shape that opens toward the transversely inward direction of the vehicle 1. The outer pillar member 3B is coupled to the outside of the inner pillar member 3A to cover a lower portion of the inner pillar member 3A so that the inner pillar member 3A and the outer pillar member 3B form a closed cross section. Then, the upper terminal end of the outer pillar member 3B is welded to the outer surface of the inner pillar member 3A at a coupling portion C of the center pillar 3. In other words, the center pillar 3 is preferably configured and arranged such that the outer pillar member 3B branches toward the outside of the cabin from the coupling portion C of the center pillar 3 where the outer pillar member 3B is coupled to the inner pillar member 3A as seen in FIG. 4. Furthermore, as seen in FIGS. 3 and 4, a garnishing member 14 is preferably provided to cover the transversely inward side (i.e., the side facing toward the inside of the vehicle cabin) of the inner pillar member 3A.

In the first embodiment of the present invention, the strength of the outer pillar member 3B is preferably designed to be smaller than the strength of the lower portion of the inner pillar member 3A to which the outer pillar member 3B is attached. The inner pillar member 3A is configured to be generally curved outward in the transverse direction of the vehicle 1.

Figure 5:
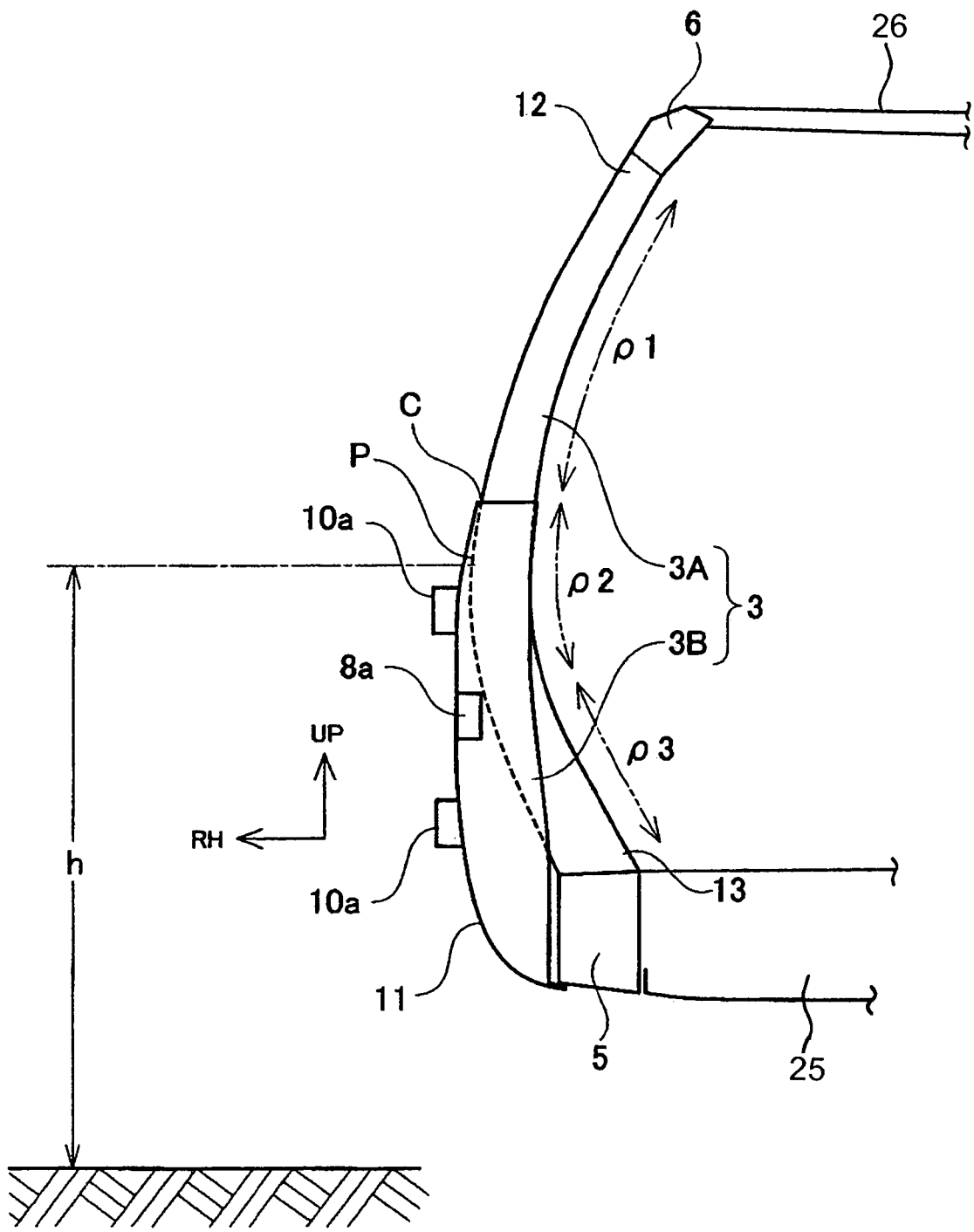
FIG. 5 is a front elevational view of the vehicle body side structure including the center pillar in accordance with the first embodiment of the present invention.

More specifically, the inner pillar member 3A is configured and arranged to have a generally convex shape that generally curves toward the transversely outward direction of the vehicle body as shown in FIGS. 3 to 5. More specifically, as shown in FIGS. 3 and 5, the curved shape of the inner pillar member 3A preferably includes an apex portion P disposed farther to the outside than any other portion of the inner pillar member 3A. The portions above and below the apex portion P are also preferably configured to curve convexly outward from the cabin. Moreover, the apex portion P of the inner pillar member 3A preferably has a prescribed radius of curvature $\rho 2$ that is smaller than a radius of curvature at any other portion of the inner pillar member 3A. In other words, a prescribed radius of curvature $\rho 1$ of a portion above the apex portion P and a prescribed radius of curvature $\rho 3$ of a portion below the apex portion P are arranged larger than the radius of curvature $\rho 2$ of the apex portion P as seen in FIGS. 3 and 5. Moreover, the prescribed radius of curvature $\rho 1$ is preferably set equal to or smaller than the prescribed radius of curvature $\rho 3$ (i.e., $\rho 2 < \rho 1 \leq \rho 3$). Furthermore, as shown in FIG. 5, the vehicle body side structure of the first embodiment is preferably configured and arranged so that a vertical height h between the ground and the apex portion P is approximately 400 to approximately 800 millimeters.

Also, the coupling portion C of the center pillar 3 where the upper end portion of the outer pillar member 3B is coupled to the inner pillar member 3A is preferably offset from the apex portion P of the inner pillar member 3A. In other words, the coupling portion C is preferably located either above or below the apex portion P of the inner pillar member 3A. In the first embodiment of the present invention, the coupling portion C is offset in the upward direction of the vehicle body, i.e., toward the roof side rail 6, as seen in FIG. 5.

As seen in FIG. 5, the side sills 5 (only one shown) and a floor cross member 25 form an upper structural portion with the side sills 5 (only one shown) extending in a generally longitudinal direction of the vehicle body side structure. The roof side rails 6 (only one shown) and a roof cross member 26 form a lower structural portion with the roof side rails 6 (only one shown) extending in a generally longitudinal direction of the vehicle body side structure.

Figure 6:
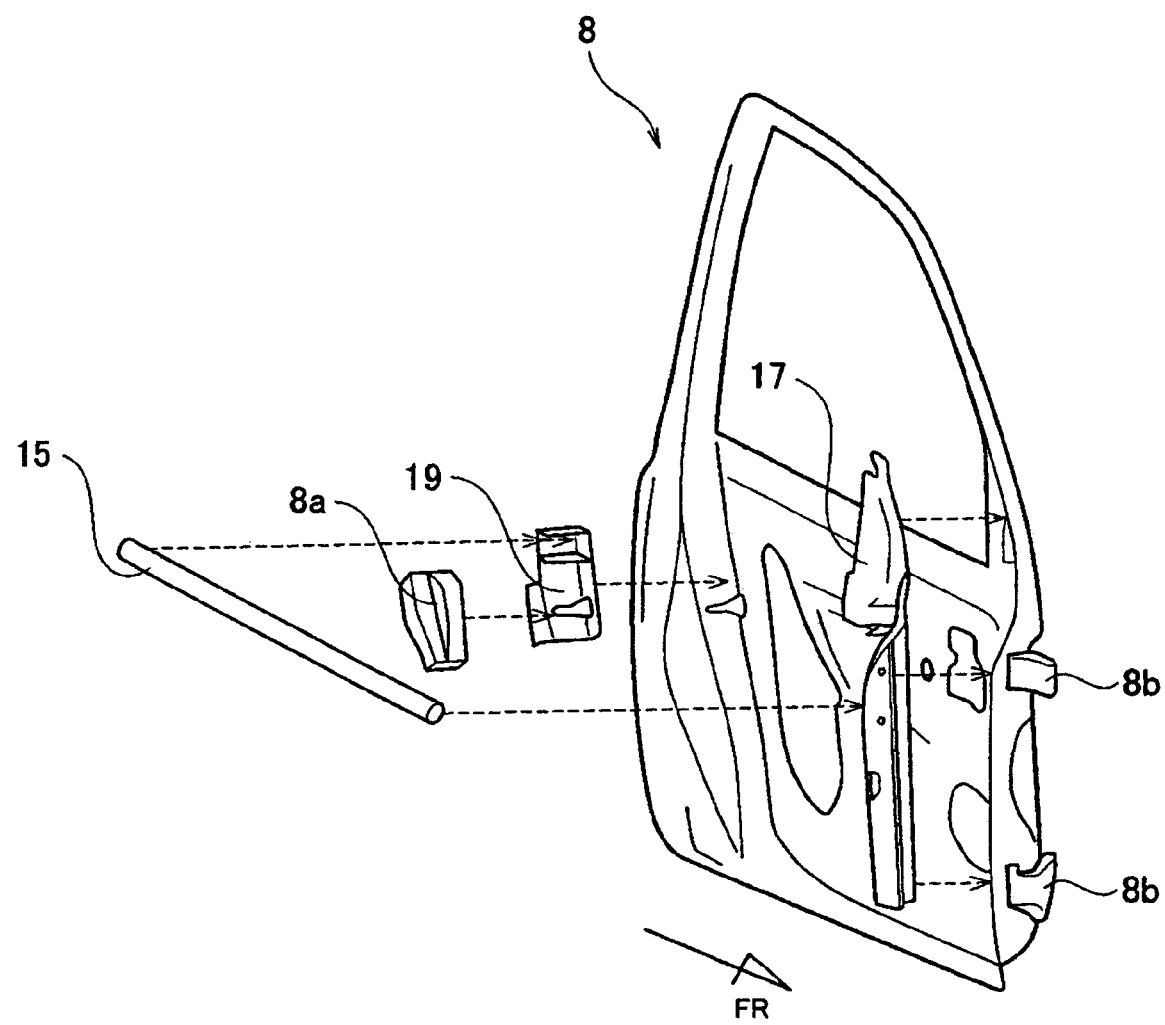
FIG. 6 is an exploded perspective view of an inside of a front door of the vehicle body side structure in accordance with the first embodiment of the present invention.
Figure 7:
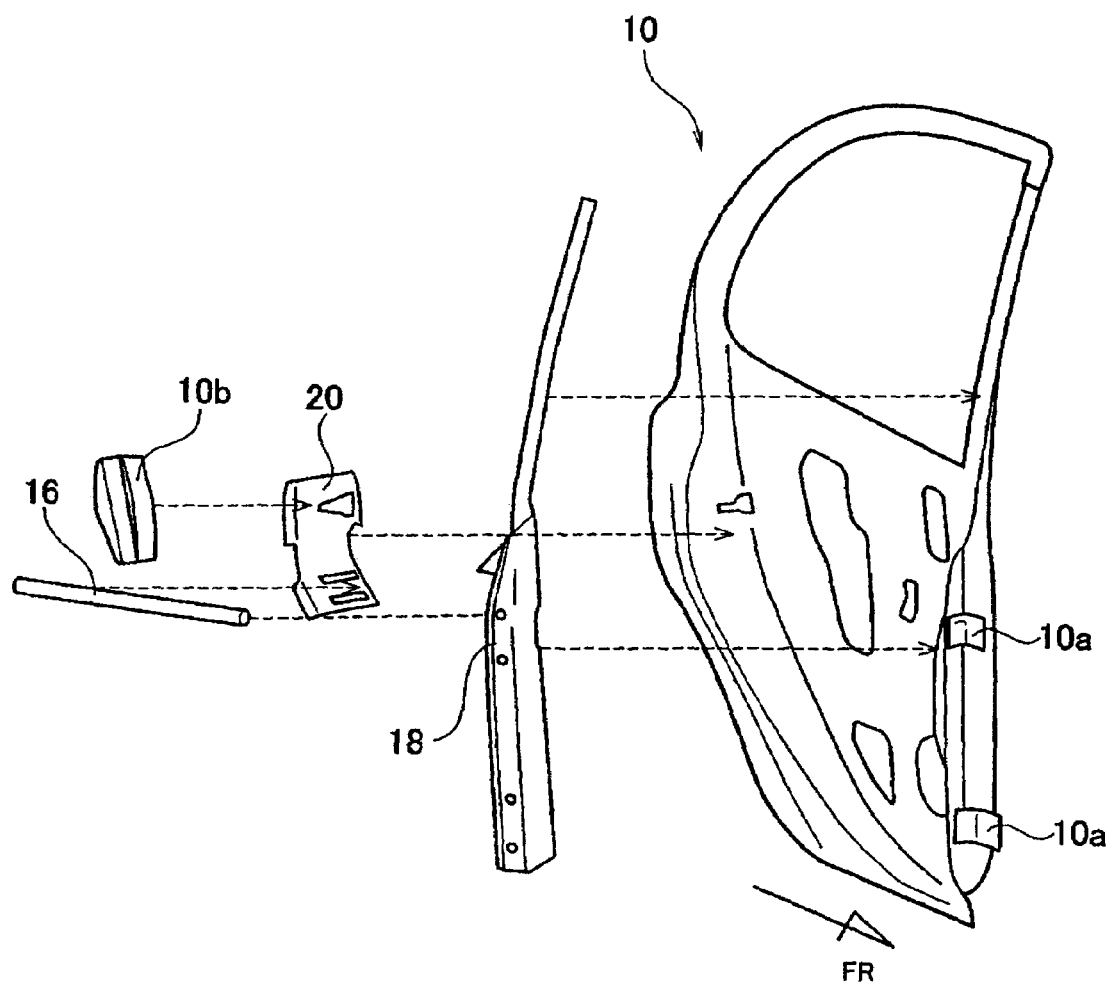
FIG. 7 is an exploded perspective view of an inside of a rear door of the vehicle body side structure in accordance with the first embodiment of the present invention.

FIG. 6 is an exploded perspective view of the inside of the front door 8, while FIG. 7 is an exploded perspective view of the inside of the rear door 10. As explained above, the front door 8 and rear door 10 are preferably provided with the front guard bar 15 and the rear guard bar 16, respectively, that are oriented in the longitudinal direction of the vehicle body. The front guard bar 15 and the rear guard bar 16 constitute reinforcement members that increase the strength of the front door 8 and the rear door 10. Moreover, the front door 8 includes a hinge reinforcement member 17 provided in a front portion of the front door 8 and a lock reinforcement member 19 provided in a rear portion of the front door 8. The front guard bar 15 is preferably coupled to and span between the hinge reinforcement member 17 and the lock reinforcement member 19. Likewise, the rear door 10 includes a hinge reinforcement member 18 provided in a front portion of the rear door 10 and a lock reinforcement member 20 provided in a rear portion of the rear door 10. The rear guard bar 16 is preferably coupled to and span between the hinge reinforcement member 18 and the lock reinforcement member 20.

Moreover, as seen in FIGS. 6 and 7, the front door 8 and the rear door 10 include hinges 8b and 10a, respectively, that are configured to be coupled to the hinge reinforcement members 17 and 18, respectively. The front door 8 and the rear door 10 also include lock mechanisms 8a and 10b, respectively, that are configured to be coupled to the lock reinforcement members 19 and 20, respectively.

Figure 8:
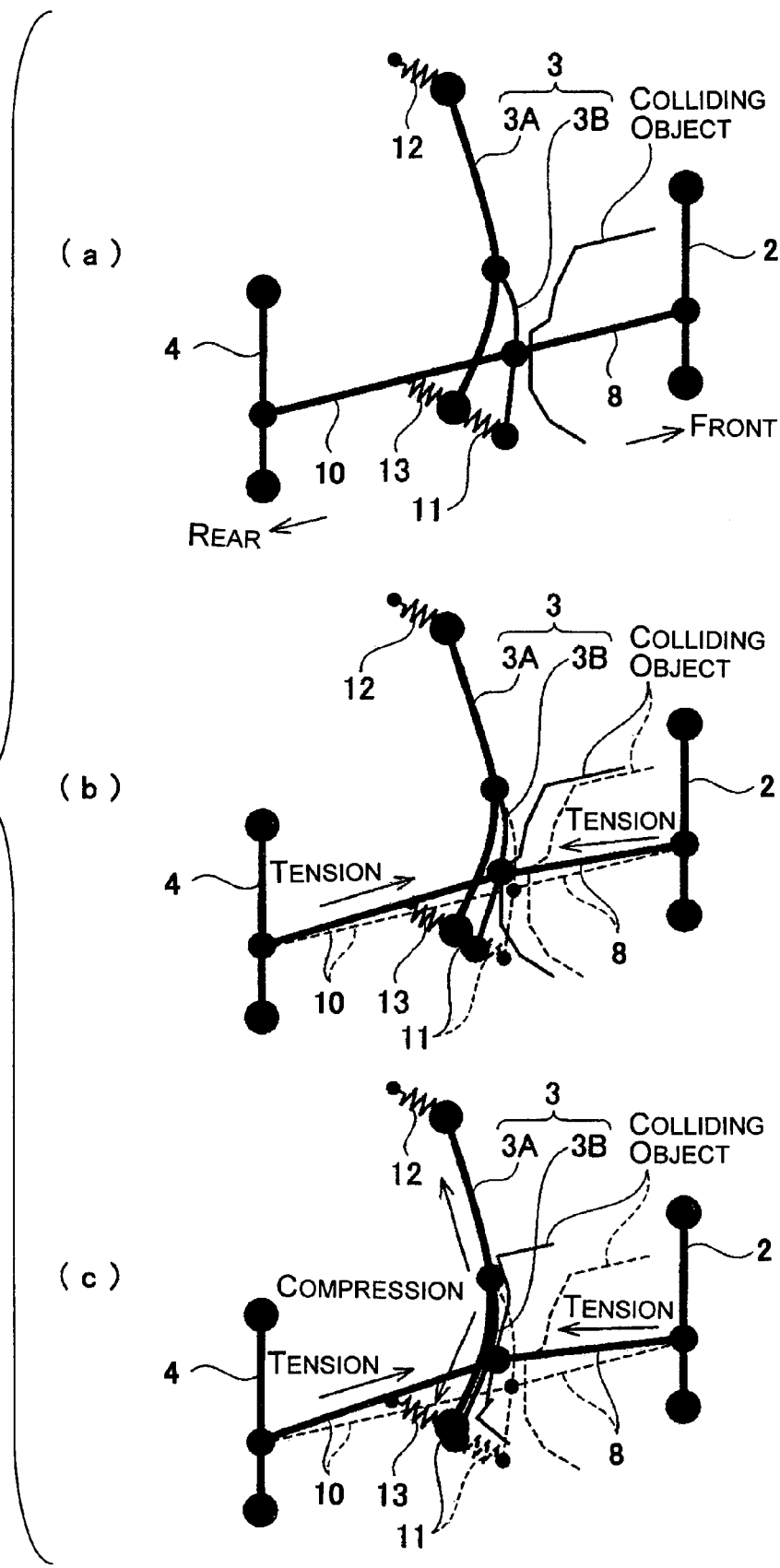
FIG. 8 are schematic diagrams illustrating a basic concept of how an input load is transmitted in the vehicle body side structure in accordance with the first embodiment of the present invention during a side collision in sequence with stages (a) to (c)

Referring now to FIG. 8, the basic concept of how an input load is transmitted in the vehicle body side structure during a side collision will be explained. FIG. 8 is diagrammatic views conceptually illustrating how the vehicle body side structure behaves during a side collision in sequence with stages (a) to (c). As explained above, the front door 8 is reinforce by the front guard bar 15, and coupled to the center pillar 3 and the front pillar 2 via the lock mechanism 8a and the hinge 8b, respectively. The rear door 10 is reinforced by the rear guard bar 16, and coupled to the center pillar 3 and the rear pillar 4 via the hinge 10a and the lock mechanism 10b, respectively. Thus, with the vehicle body side structure of the first embodiment, when the collision load is imparted to the front door 8 and the rear door 10 due to a side collision with a colliding object, the front door 8 and the rear door 10 support tensile forces between the front pillar 2 and the center pillar 3 and between the center pillar 3 and the rear pillar 4, respectively, and transmit the collision load to the center pillar 3, the front pillar 2, and the rear pillar 4.

The front door 8 and the rear door 10 are arranged to be substantially perpendicular to the direction of the collision load F input during the initial stage of a collision as seen in stage (b) of FIG. 8. Therefore, tension components carried by the front door 8 and the rear door 10 increase as the center pillar 3 is deformed inwardly in the transverse direction of the vehicle 1, thereby increasing the load transmission efficiency.

When the center pillar 3 moves inward, the outer pillar member 3B swings toward the inside of the cabin about a fulcrum located at the upper end portion thereof at the coupling portion C of the center pillar 3. As shown in stage (b) of FIG. 8, the force associated with the displacement of the center pillar 3 can be absorbed by the main energy absorbing section 11 provided at the lower end portion of the outer pillar member 3B. As a result, the degree to which the load is transmitted from the front door 8 and the rear door 10 to the inner pillar member 3A can be reduced effectively.

As shown in stage (c) of FIG. 8, at an intermediate stage and later stages of the collision, two load transmission paths are formed with respect to the load input of the side collision. More specifically, the load can be transmitted through the front door 8 and the rear door 10, and also transmitted through the inner pillar member 3A that is substantially independently of the front door 8 and the rear door 10.

Figure 9:
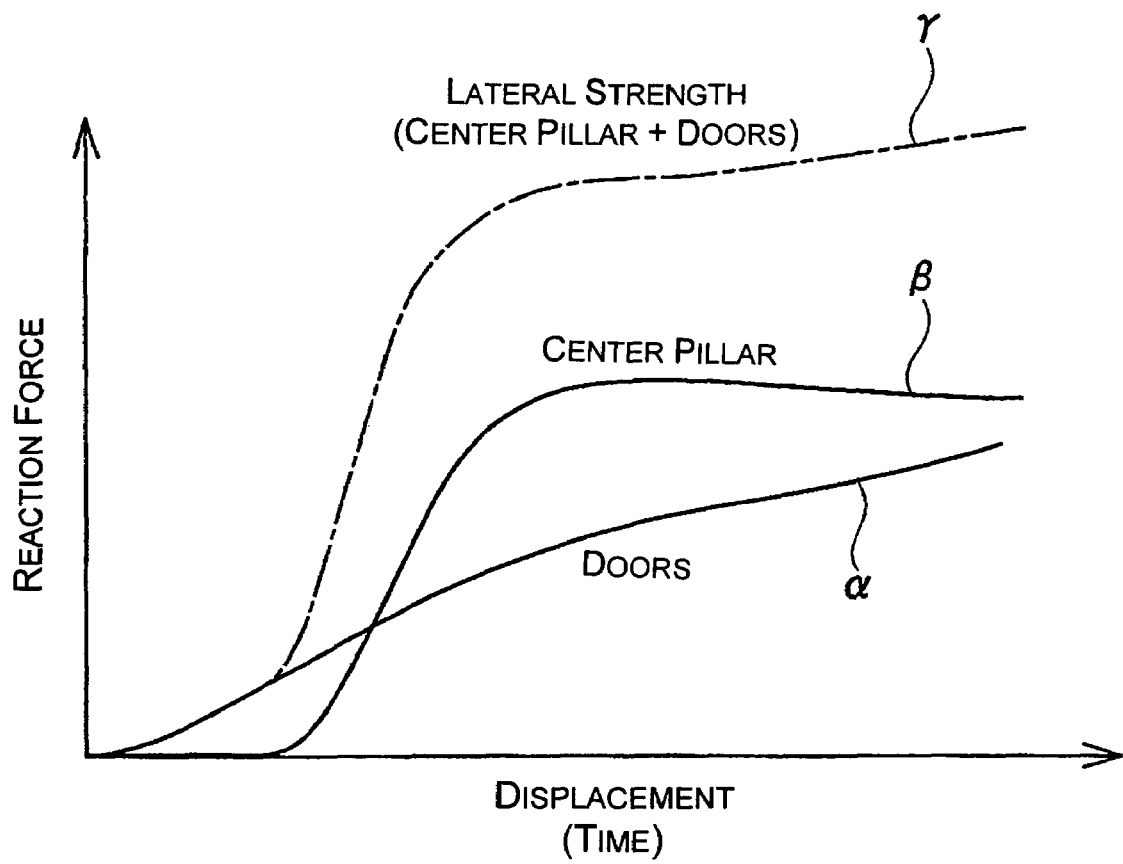
FIG. 9 is a simplified chart illustrating reaction force characteristics of the vehicle body side structure versus time or displacement during a side collision in accordance with the first embodiment of the present invention.

FIG. 9 is a simplified chart of the reaction force characteristics of the vehicle body side structure versus time (displacement) during a side collision. In FIG. 9, $\alpha$ is the characteristic curve of the reaction force that acts on the front door 8 and the rear door 10, $\beta$ is the characteristic curve of the reaction force that acts on the center pillar 3, and $\gamma$ is the characteristic curve of the reaction force that can born by the front door 8 and the rear door 10 and the center pillar 3 together. In other words, the characteristic curve $\gamma$ is the sum of the characteristic curves $\alpha$ and $\beta$. With the vehicle body side structure of the first embodiment, a concentration of the inputted load at the center pillar 3, which is common in conventional vehicle body side structures, is suppressed. Rather, the load can be dispersed efficiently among a plurality of members as shown in FIG. 9. Thus, sufficient vehicle body strength can be secured with a smaller increase in weight of the vehicle 1.

In addition to the operational effects described above, the vehicle body side structure of the first embodiment of the present invention is also provided with the subordinate energy absorbing sections 12 and 13 at the portions where the inner pillar member 3A is coupled to the side sill 5 and the roof side rail 6, respectively. The subordinate energy absorbing sections 12 and 13 are configured and arranged to absorb collision energy when an excessively large collision load is imparted to the vehicle body side structure. Therefore, a localized bending of the inner pillar member 3A can be prevented and the amount by which the inner pillar member 3A penetrates into the cabin can be minimized.

Furthermore, in the first embodiment of the present invention, the reaction force characteristics of the subordinate energy absorbing section 12 and 13 are preferably set to be larger than the reaction force characteristic of the main energy absorbing section 11 that is part of the outer pillar member 3B, as explained above. Therefore, the main energy absorbing section 11 of the outer pillar member 3B alone can be made to deform with certainty in the initial stage of a side collision when the portions of the frond door 8 and the rear door 10 that are connected to the outer pillar member 3B undergo displacement toward the inside of the cabin.

Moreover, in the first embodiment of the present invention, the outer pillar member 3B is preferably formed to have a hat-shaped cross section, i.e., a generally U-shaped cross sectional shape that opens toward the transversely inward direction of the vehicle 1. The upper terminal end of the outer pillar member 3B is welded to the outside surface of the inner pillar member 3A to cover the inner pillar member 3A so that the outer pillar member 3B and the inner pillar member 3A form a closed cross section. The center pillar 3 is preferably configured and arranged so that the outer pillar member 3B branches toward the outside of the cabin from the coupling portion C where the outer pillar member 3B is coupled to the inner pillar member 3A. The garnishing member 14 is preferably arranged to cover the transversely inward facing side of the inner pillar member 3A. Therefore, the outer pillar member 3B is configured and arranged to reinforce the inner pillar member 3A at the portion of the center pillar 3 above the coupling portion C. Also, since the outer pillar member 3B is configured and arranged to form a closed cross section with the inner pillar member 3A at the portion of the center pillar 3 below the coupling portion C, the main energy absorbing section 11 can be easily formed at the portion where the bottom end portion of the outer pillar member 3B is coupled to the side sill 5.

Furthermore, in the first embodiment of the present invention, the outer pillar member 3B is preferably made by press forming a panel material to obtain a generally U-shaped cross sectional shape. Therefore, the strength and the rigidity of the portions where the front door 8 and the rear door 10 are coupled to the outer pillar member 3B can be secured easily by employing a conventional tailored blank method using steel sheets or the like of different thicknesses or by employing a conventional method of installing patch reinforcing materials.

Also, in the first embodiment of the present invention, the inner pillar member 3A is preferably configured to generally curve outwardly in the transverse direction of the vehicle 1. Therefore, an axial force can be generated in the inner pillar member 3A when a load is imparted to the inner pillar member 3A in the transverse direction of the vehicle during a side collision. As a result, the sharp rise in the reaction force of the vehicle body side structure that occurs in the initial stages of a collision can be made to occur earlier and the strength of the vehicle body side structure can be improved.

Moreover, the curved shape of the inner pillar member 3A is provided with the apex portion P where the prescribed radius of curvature $\rho2$ is smaller than at any other portion of the inner pillar member 3A. Also, the apex portion P is provided in a position that is farther to the outside than any other portion of the inner pillar member 3A, and the height h of the apex portion P above the ground is preferably set approximately 400 to approximately 800 millimeters. Therefore, an input from a bumper or a portion in the vicinity of the bumper of a colliding vehicle is more likely to be born by the apex portion P when a side collision occurs. Thus, the generation of the reaction force of the vehicle body side structure can be made to occur early during a side collision with a higher degree of certainty.

As explained above, the portions of the inner pillar member 3A above and below the apex portion P are each provided with the prescribed radius of curvatures $\rho1$ and $\rho3$, respectively, configured to curve convexly outward from the cabin of the vehicle 1. Therefore, when a lengthwise compressive force acts on curved portions the inner pillar member 3A in the initial stage of a collision, a moment is induced as an internal force in such a direction as to bend the inner pillar member 3A convexly outwardly in the transverse direction of the vehicle. This induced moment counteracts an external moment resulting from an external force that acts on the center pillar 3 during a side collision in such a direction as to bend the center pillar convexly inward in the transverse direction of the vehicle 1. Thus, the load imposed on the center pillar 3 by the external force can be reduced. As a result, the maximum value of the reaction force of the vehicle body side structure with respect to a colliding object can be increased without relying on a separate reinforcing components such as reinforcement patches.

Moreover, the prescribed radius of curvature $\rho1$ of the portion above the apex portion P is preferably set equal to or smaller than the prescribed radius of curvature $\rho3$ of the portion below the apex portion P. Thus, a deformation of the vehicle body in the vicinity of passenger's head and chest can be readily suppressed during a side collision. As a result, the severe injuries that can be easily incurred by these parts of the human body can be prevented.

Furthermore, in the first embodiment of the present invention, the coupling portion C of the center pillar 3 where the upper end portion of the outer pillar member 3B is coupled to the inner pillar member 3A is preferably offset so as to be located either above or below the apex portion P of the inner pillar member 3A. Therefore, the strength distribution at the apex portion P, which bears the load inputted from the colliding object, can be held substantially constant in the initial stage of a collision. As a result, a deformation pattern of the portion that supports the input load can be further stabilized.

More specifically, in the first embodiment of the present invention, the coupling portion C of the center pillar 3 is preferably offset in the upward direction of the vehicle body, i.e., toward the roof side rail 6. Therefore, the outer pillar member 3B is configured and arranged to reinforce the apex portion P of the inner pillar member 3A and the strength of the inner pillar member 3A with respect to the input load of a side collision can be increased.

As explained above, the longitudinal strengths of the front door 8 and rear door 10 are increased by the front guard bar 15 and the rear guard bar 16 being longitudinally oriented on the inside of the front door 8 and the rear door 10, respectively. Accordingly, the tensile forces that develop in the front door 8 and the rear door 10 during a side collision can also be transmitted to the front pillar 2 and the rear pillar 4 with good efficiency. As a result, the load to be imparted to the center pillar 3 can be effectively dispersed and the overall strength of the vehicle body side structure can be increased.

Moreover, the front guard bar 15 is coupled between the hinge reinforcement member 17 provided on the forward portion of the front door 8 and the lock reinforcement member 19 provided on the rearward portion of the front door 8. Likewise, the rear guard bar 16 is coupled between the hinge reinforcement member 18 provided on the forward portion of the rear door 10 and the lock reinforcement member 20 provided on the rearward portion of the rear door 10. Therefore, the coupling rigidity of the end parts of each of the front guard bar 15 and the rear guard bar 16 is increased, and the tensile forces that develop in the front guard bar 15 and the rear guard bar 16 can be transmitted to the corresponding members that support the front guard bar 15 and the rear guard bar 16 even more efficiently.

Second Embodiment

Figure 10:
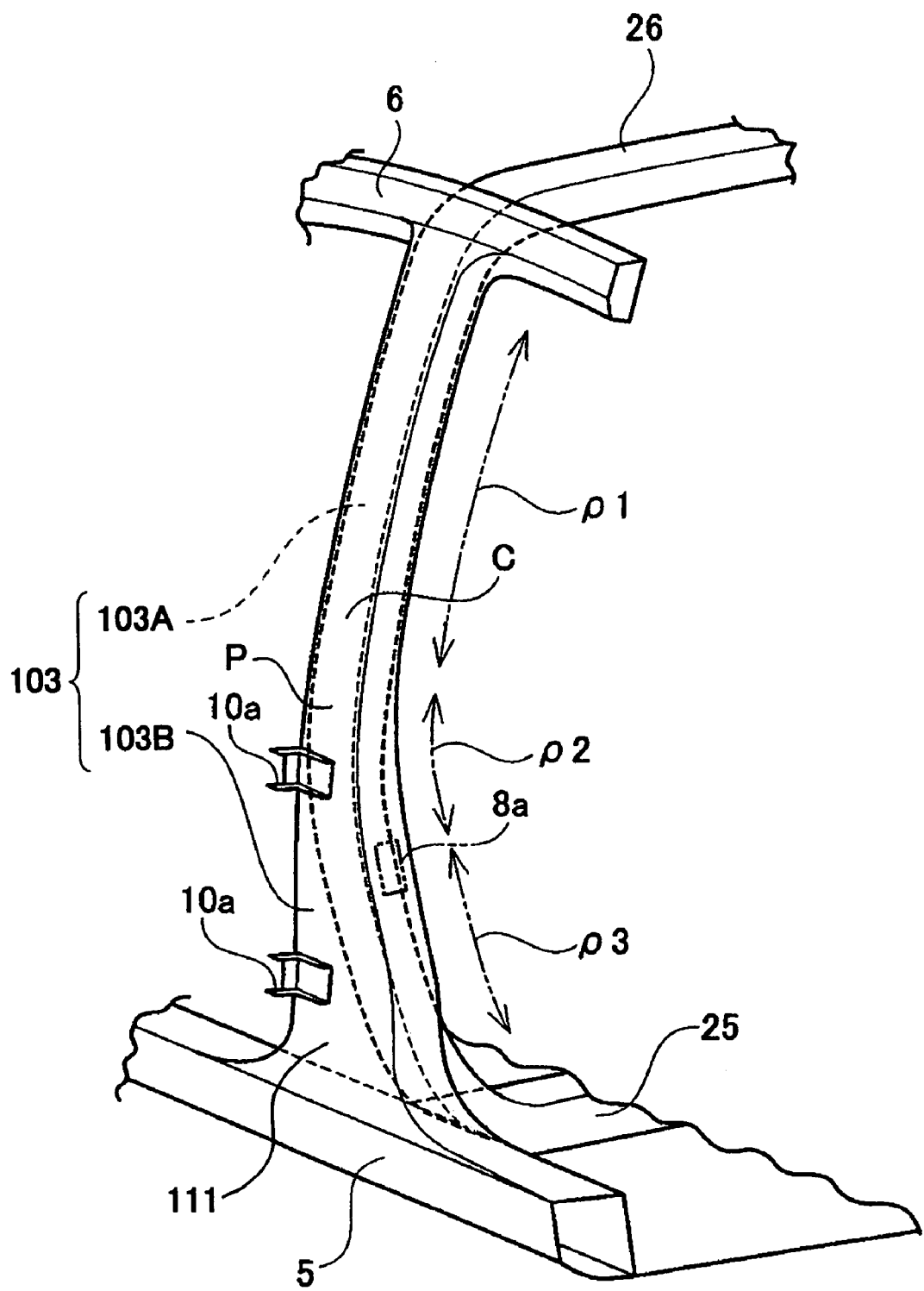
FIG. 10 is a perspective view of a center pillar of a vehicle body side structure in accordance with a second embodiment of the present invention.
Figure 11:
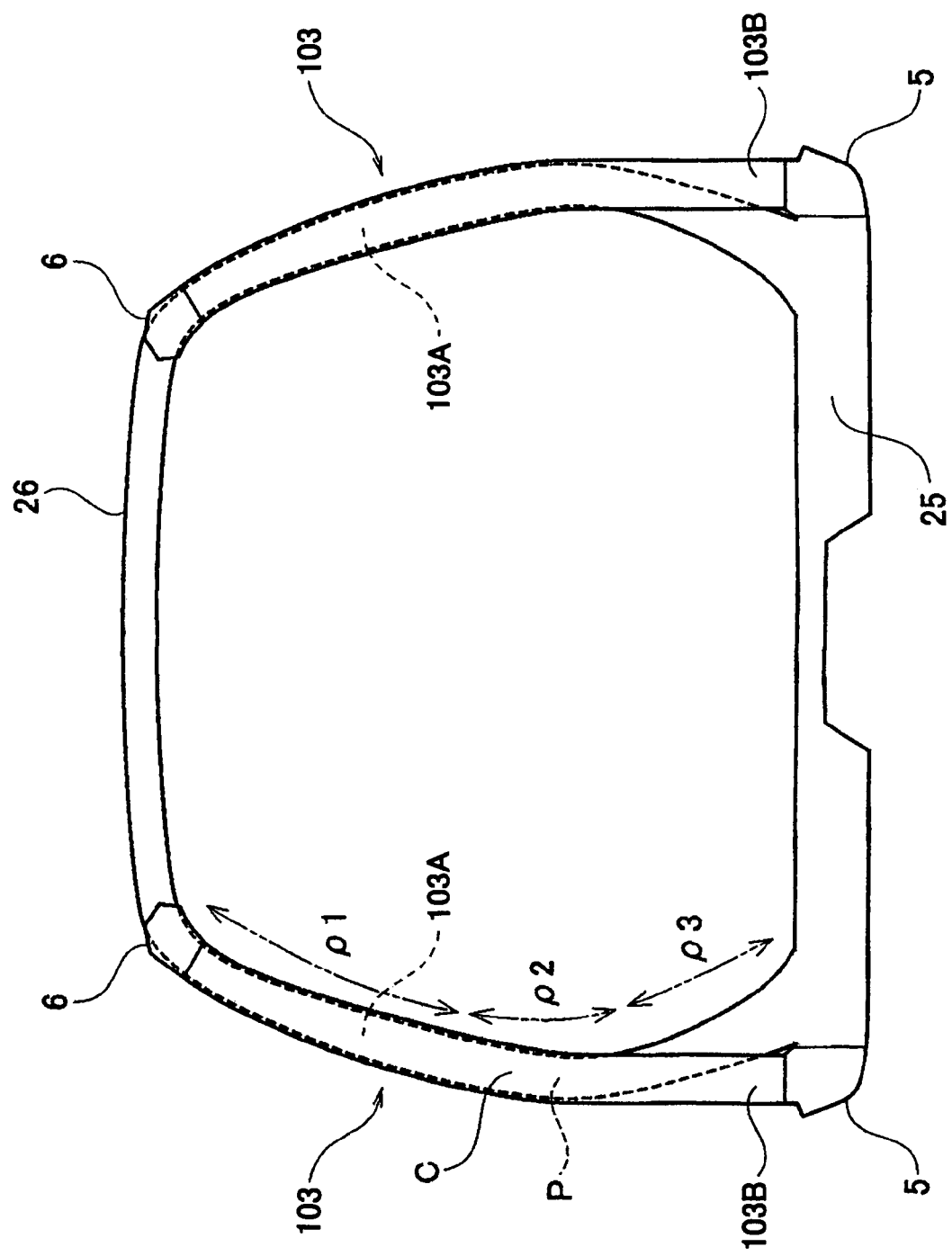
FIG. 11 is a simplified front elevational view of the vehicle body side structure in accordance with the second embodiment of the present invention.
Figure 12:
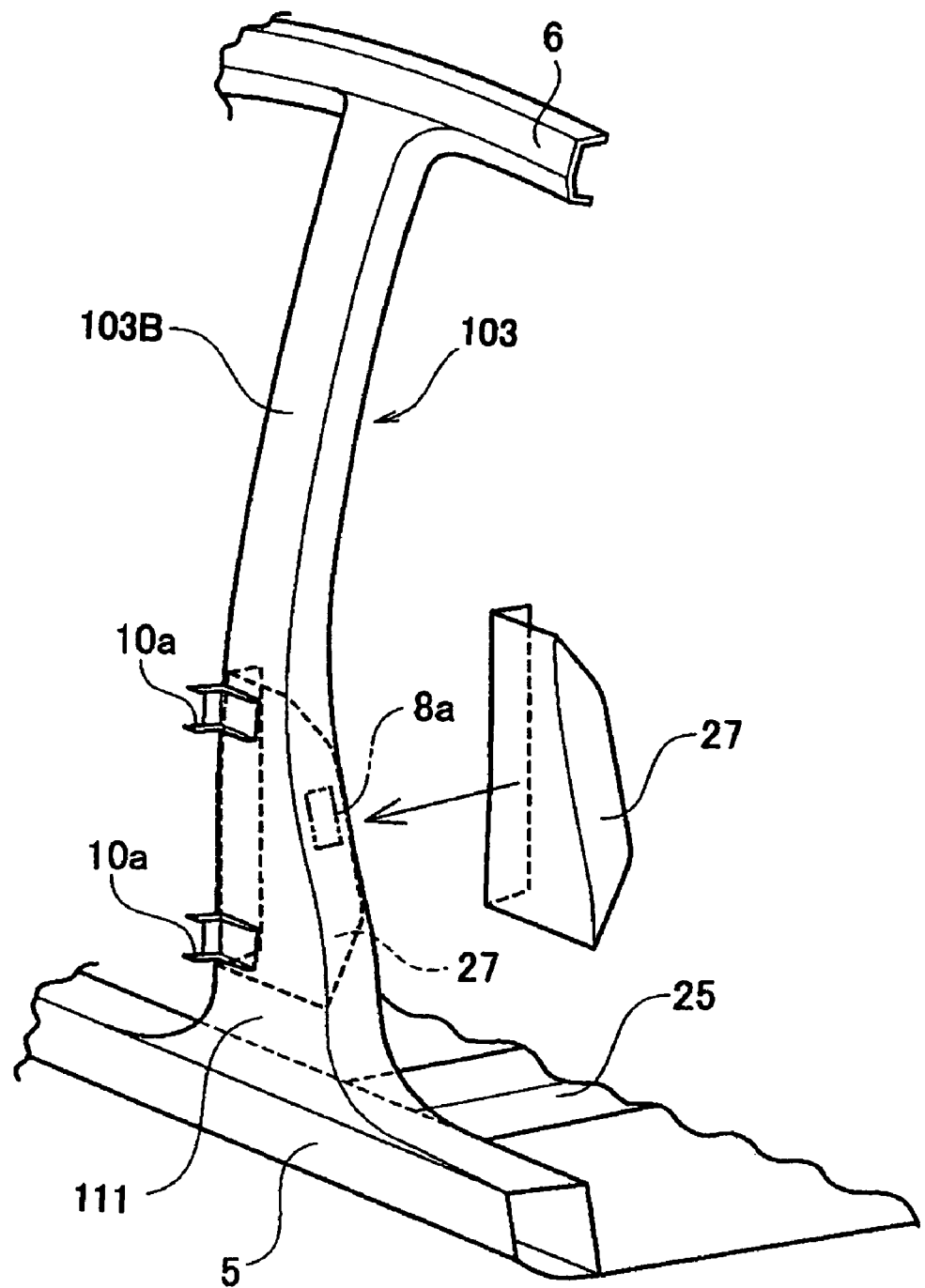
FIG. 12 is a partially exploded perspective view of the center pillar of the vehicle body side structure in accordance with the second embodiment of the present invention with a reinforcement member detached.

FIGS. 10 to 12 show a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 10 is a perspective view illustrating a center pillar 103 of the second embodiment when the center pillar 103 is fully assembled. FIG. 11 is a simplified front elevational view of the vehicle body side structure including the left and right center pillars 103. FIG. 12 is perspective view of an outer pillar member 103B of the center pillar 103 with an outer pillar reinforcement member 27 detached.

The vehicle body side structure of the second embodiment is basically identical to the vehicle body side structure of the first embodiment, except for the structure of the center pillar 103. More specifically, the center pillar 103 of the second embodiment includes an inner pillar member 103A coupled to the floor cross member 25, and the floor cross member 25 is coupled to the side sill 5 as shown in FIGS. 10 and 11. Thus, the inner pillar member 103A is indirectly coupled to the side sill 5 through the floor cross member 25. As seen in FIG. 11, the floor cross member 25 is preferably coupled between the left and right side sills 5 arranged to face opposite to each other in the transverse direction of the vehicle body such that the floor cross member 25 extends in a transverse direction of the vehicle 1. In other words, in the second embodiment of the present invention, the left and right side sills 5 are connected together and reinforced by the floor cross member 25 that extends in the transverse direction of the vehicle 1 at a position corresponding to the position where the left and right center pillars 103 are arranged as seen in FIG. 11. Similarly, the left and right side roof rails 6 are connected together and reinforced by the roof cross member 26 that extends in the transverse direction of the vehicle 1 at a position corresponding to the position where the left and right center pillars 103 are arranged. As in the first embodiment of the present invention, each one of the front pillars 2, the center pillars 103, the rear pillars 4, the side sills 5 and the roof side rails 6 are disposed on each side of the vehicle 1 to form the vehicle body side structure of the second embodiment in the same manner, except that they are mirror images of each other. Therefore, only one transverse side (i.e., right side) of the vehicle body side structure will be discussed and illustrated in detail herein.

In the second embodiment, the inner pillar member 103A is preferably a generally pipe-shaped, closed cross sectional member that is made preferably using a hydraulic forming method. Moreover, the left and right inner pillar members 103A are preferably formed integrally with the floor cross member 25 and the roof cross member 26 as single, one-piece, unitary member. In other words, the left and right inner pillar members 103A, the floor cross member 25 and the roof cross member 26 form an annular shaped member that is oriented in the transverse direction of the vehicle body as seen in FIG. 11. Alternatively, the left and right inner pillar members 103A can be formed separately but connected to the floor cross member 25 and the roof cross member 26 to form the annular shaped member that is oriented in the transverse direction of the vehicle body. Also, the left and right inner pillar members 103A can be integrally formed with one of the floor cross member 25 and the roof cross member 26 as single, one-piece, unitary U-shaped member that is connected to the other of the cross members 25 and 26 that is separately formed. In any event, the left and right inner pillar members 103A, the floor cross member 25 and the roof cross member 26 form an annular shaped member or tube that is oriented in the transverse direction of the vehicle body.

As seen in FIG. 10, in the second embodiment, the outer pillar member 103B preferably has a generally U-shaped cross section and is coupled to the side sill 5 and the side roof rail 6 to extend therebetween. However, it will be apparent to those skilled in the art from this disclosure that the outer pillar member 103B can be configured to have a vertical length of approximately one-half the vertical length of the inner pillar member 103A and coupled between the inner pillar member 103A and the side sill 5 in the same manner as the first embodiment explained above.

Moreover, the outer pillar member 103B of the second embodiment preferably includes the outer pillar reinforcement member 27 as shown in FIG. 12. More specifically, the outer pillar reinforcement member 27 is preferably provided on the inside surface of the outer pillar member 103B, which has a generally U-shaped cross section. The outer pillar reinforcement member 27 is configured to support the lock mechanism 8a provided on the rear end portion of the front door 8 and the hinge 10a provided on the front end portion of the rear door 10. As seen in FIG. 12, the outer pillar reinforcement member 27 is formed to have a generally U-shaped cross sectional shape such that the outer pillar reinforcement member 27 follows the contour of the inside of the outer pillar member 103B and is attached integrally to the inside of the outer pillar member 103B by spot welding or the like.

Similarly to the first embodiment explained above, an approximate center portion of the outer pillar member 103B is coupled to the outside surface of the inner pillar member 103A at the coupling portion C. Also, a main energy absorbing section 111 is formed at a lower end portion of the outer pillar member 103B as in the first embodiment. Moreover, the lock mechanism 8a of the front door 8 and the hinge 10a of the rear door 10 are preferably supported only by the outer pillar member 103B of the center pillar 103.

Furthermore, the curved shape of the inner pillar member 103A preferably has the features that are the substantially same as the first embodiments. In other words, as seen in FIG. 11, the entire inner pillar member 103A is generally curved in a transversely outward direction of the vehicle and has the apex portion P where the prescribed radius of curvature ρ2 is smaller than at any other portion of the inner pillar member 103A. The apex portion P is provided in a position that is farther to the outside than any other portion of the inner pillar member 103A. The prescribed radius of curvature ρ1 of the portion above the apex portion P is equal to or smaller than the prescribed radius of curvature ρ3 of the portion below the apex portion P.

Accordingly, the second embodiment of the present invention provides basically the same operational effects as the first embodiment. However, in the second embodiment, the inner pillar member 103A is indirectly coupled to the side sill 5 through the floor cross member 25 as explained above. Therefore, the vehicle dimensions can be streamlined and a more compact vehicle body can be achieved even when the center pillar 103 has a double-layered structure comprising the inner pillar member 103A layered under the outer pillar member 103B. Furthermore, an input load due to a side collision can be dispersed more efficiently because the input load can be transmitted directly from the inner pillar member 103A to the floor cross member 25.

Also, in the second embodiment, the inner pillar member 103A preferably is a generally pipe-shaped, closed cross sectional member that is made using a hydraulic forming method. Moreover, the left and right inner pillar members 13A are coupled to the floor cross member 25 and the roof cross member 26 in such a manner as to form an annular shape oriented in the transverse direction of the vehicle body. As a result, the input load is efficiently transmitted to the non-collision side (i.e., the opposite side) of the vehicle body when one side of the vehicle 1 undergoes a side collision. Thus, the load imparted during a side collision is dispersed throughout and born by the entire vehicle body, thereby increasing the rigidity of the vehicle body.

Furthermore, the outer pillar reinforcement member 27 is provided on the outer pillar member 103B to support the lock mechanisms 8a of the front door 8 and the hinge 10a of the rear door 10. Therefore, the load transmission losses that occur between the front door 8 and the rear door 10 when the front door 8 and the rear door 10 carry tensile forces during a side collision are reduced, and the input load can be distributed to and born by a plurality of members of the vehicle body with good efficiency. As a result, ample vehicle body strength can be ensured.

Third Embodiment

Figure 13:
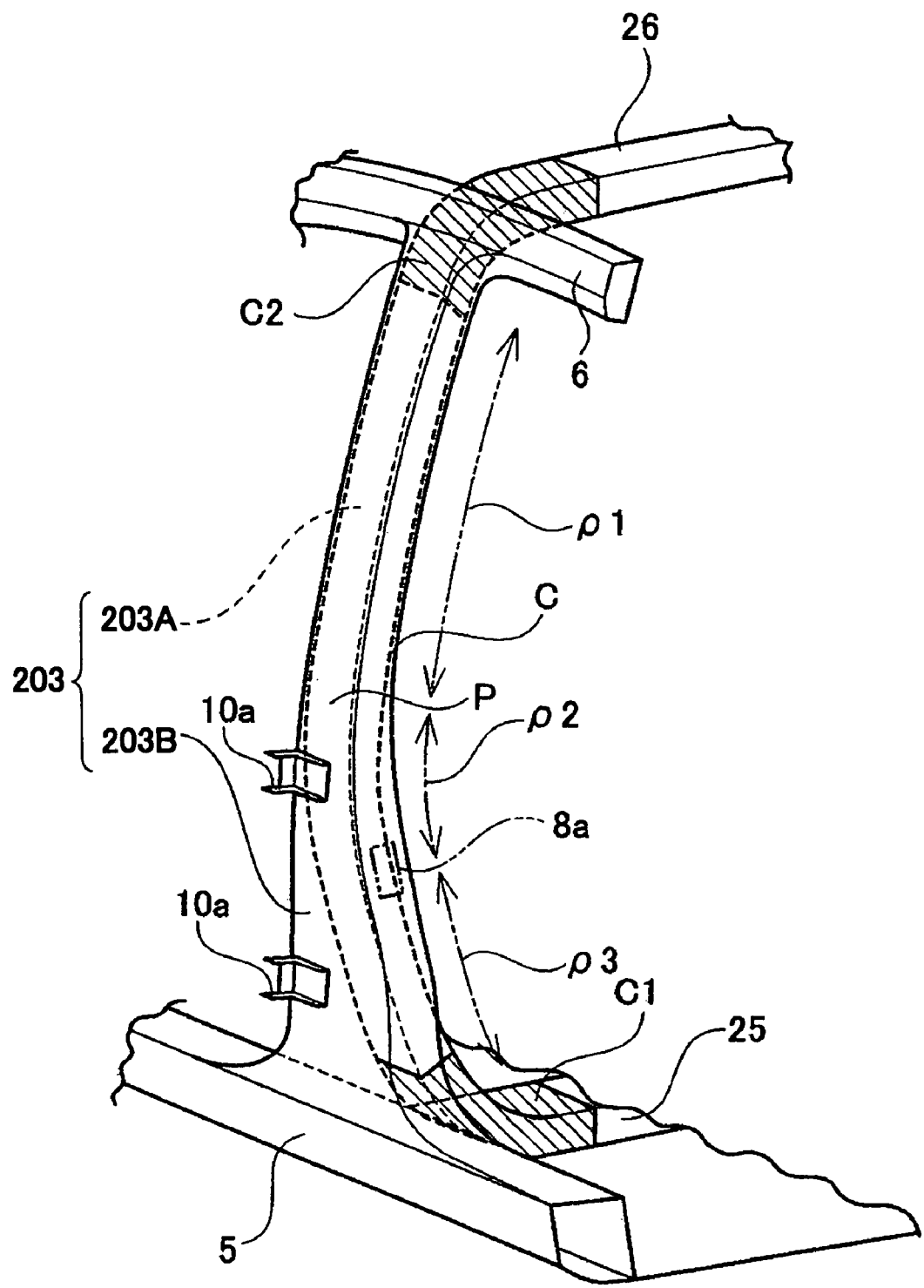
FIG. 13 is a perspective view of a center pillar of a vehicle body side structure in accordance with a third embodiment of the present invention.
Figure 14:
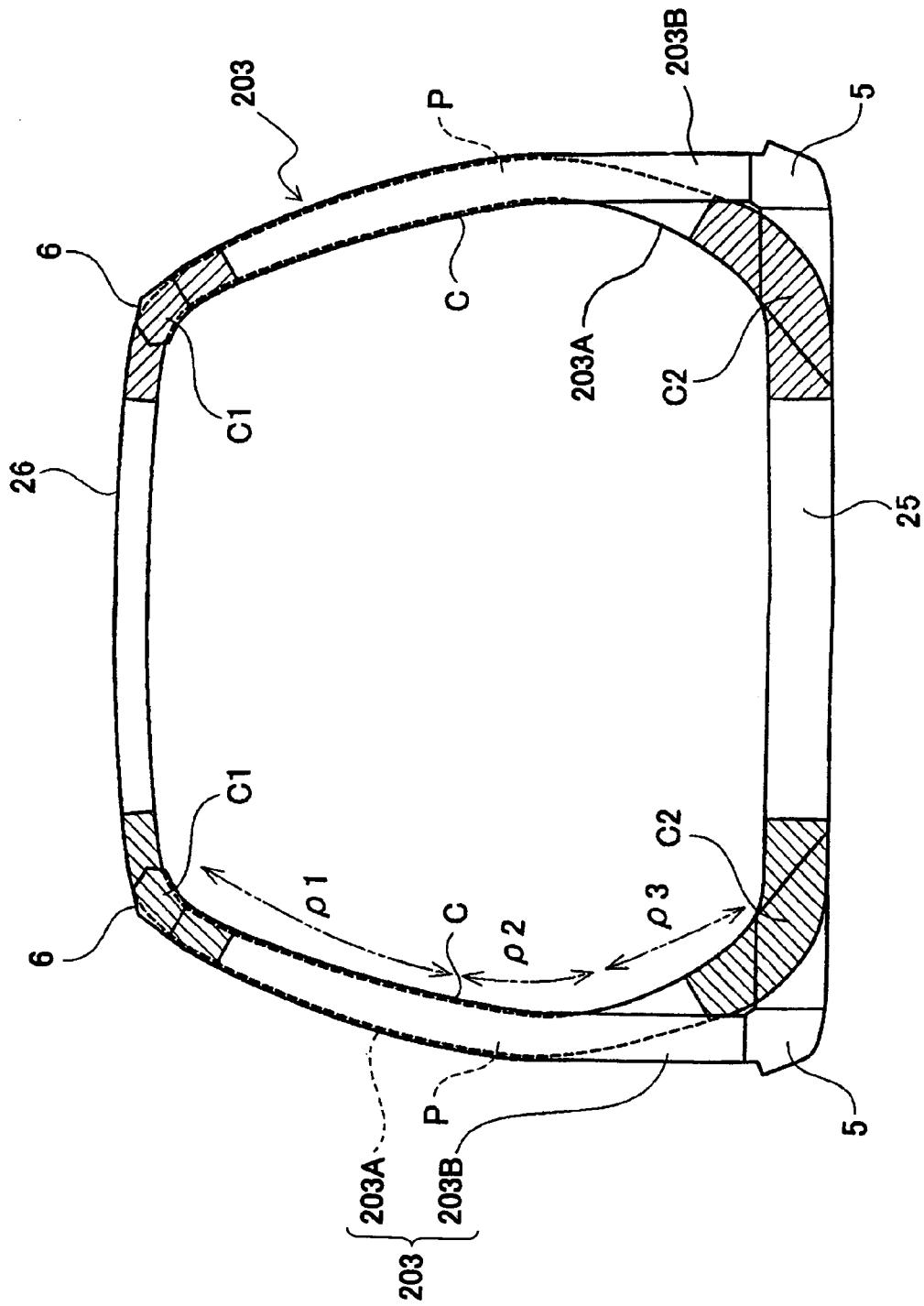
FIG. 14 is a simplified front elevational view of the vehicle body side structure in accordance with the third embodiment of the present invention.

FIGS. 13 and 14 show a third embodiment of the present invention. In view of the similarity between the third embodiment and the previously described first and second embodiments, the parts of the third embodiment that are identical to the parts of the previous embodiments will be given the same reference numerals as the parts of the previous embodiments. Moreover, the descriptions of the parts of the third embodiment that are identical to the parts of the previous embodiments may be omitted for the sake of brevity.

FIG. 13 is a perspective view illustrating a center pillar 203 of the third embodiment when the center pillar 203 is fully assembled. FIG. 14 is a front elevational view of the vehicle body side structure including the left and right center pillars 203.

The vehicle body side structure in accordance with the third embodiment is basically identical to the vehicle body side structure of the second embodiment, except that the center pillar 203 further includes a pair of higher strength portions C1 and C2 that have a higher strength than other portions of the center pillar 203. As seen in FIGS. 13 and 14, the higher strength portions C1 and C2 are disposed where the upper and lower end portions of an inner pillar member 203A are coupled to the side sill 5 and the roof side rail 6, respectively. As in the second embodiment explained above, the inner pillar member 203A of the third embodiment is preferably formed integrally with the floor cross member 25 and the roof cross member 26 in such a manner as to form an annular shape oriented in the transverse direction of the vehicle body as seen in FIG. 14. Also, as in the second embodiment, the inner pillar member 203A can be alternatively formed separately but connected to the floor cross member 25 and the roof cross member 26 to form the annular shape.

Moreover, an outer pillar member 203B of the third embodiment is preferably made by cast molding a light alloy material. The inner pillar member 203A is preferably a generally pipe-shaped, closed cross sectional member that made by using a hydraulic forming method or by joining together press formed parts similarly to the second embodiment.

Furthermore, the curved shape of the inner pillar member 203A preferably has the features that are the substantially same as the previous embodiments. In other words, the entire inner pillar member 203A is generally curved in a transversely outward direction of the vehicle and has the apex portion P where the prescribed radius of curvature $\rho 2$ is smaller than at any other portion of the inner pillar member 203A as seen in FIG. 14. The apex portion P is provided in a position that is farther to the outside than any other portion of the inner pillar member 203A. The prescribed radius of curvature $\rho 1$ of the portion above the apex portion P is equal to or smaller than the prescribed radius of curvature $\rho 3$ of the portion below the apex portion P.

Accordingly, the third embodiment of the present invention provides basically the same operational effects as the previous embodiments. In addition, in the third embodiment, the strengths of the higher strength portions C1 and C2 where the upper and lower end portions of the inner pillar members 203A are coupled to the side sill 5 and the roof side rail 6 are set to be higher than the strengths of the other portions. Therefore, the amounts by which the upper and lower end portions of the inner pillar member 203A move (displace) upward and downward due to the axial compressive components generated in the portions above and below the apex portion P when a side collision load is imparted to the apex portion P of the inner pillar member 203A can be reduced with good efficiency.

Additionally, since the outer pillar member 203B is made by cast molding a light alloy material in the third embodiment, the wall thickness distribution of the outer pillar member 203B can be controlled easily and a localized rib structure or the like can be formed easily in the outer pillar member 203B. Thus, the strength and rigidity distributions required for the outer pillar members 203B can be adjusted with good precision.

Although the coupling portion C where the outer pillar member 3B, 103B or 203B is coupled to the inner pillar member 3A, 103A or 203A is offset in the upward direction of the vehicle body from the apex portion P in the previously described embodiments, the present invention is not limited to such an arrangement. In other words, it is also feasible to arrange a center pillar 3' comprising an inner pillar member 3A' and an outer pillar member 3B' so that the coupling portion C is offset with respect to the apex portion P of the inner pillar member 3A' in the downward direction of the vehicle body, i.e., toward the side sill 5 as seen in FIG. 15.

Figure 15:
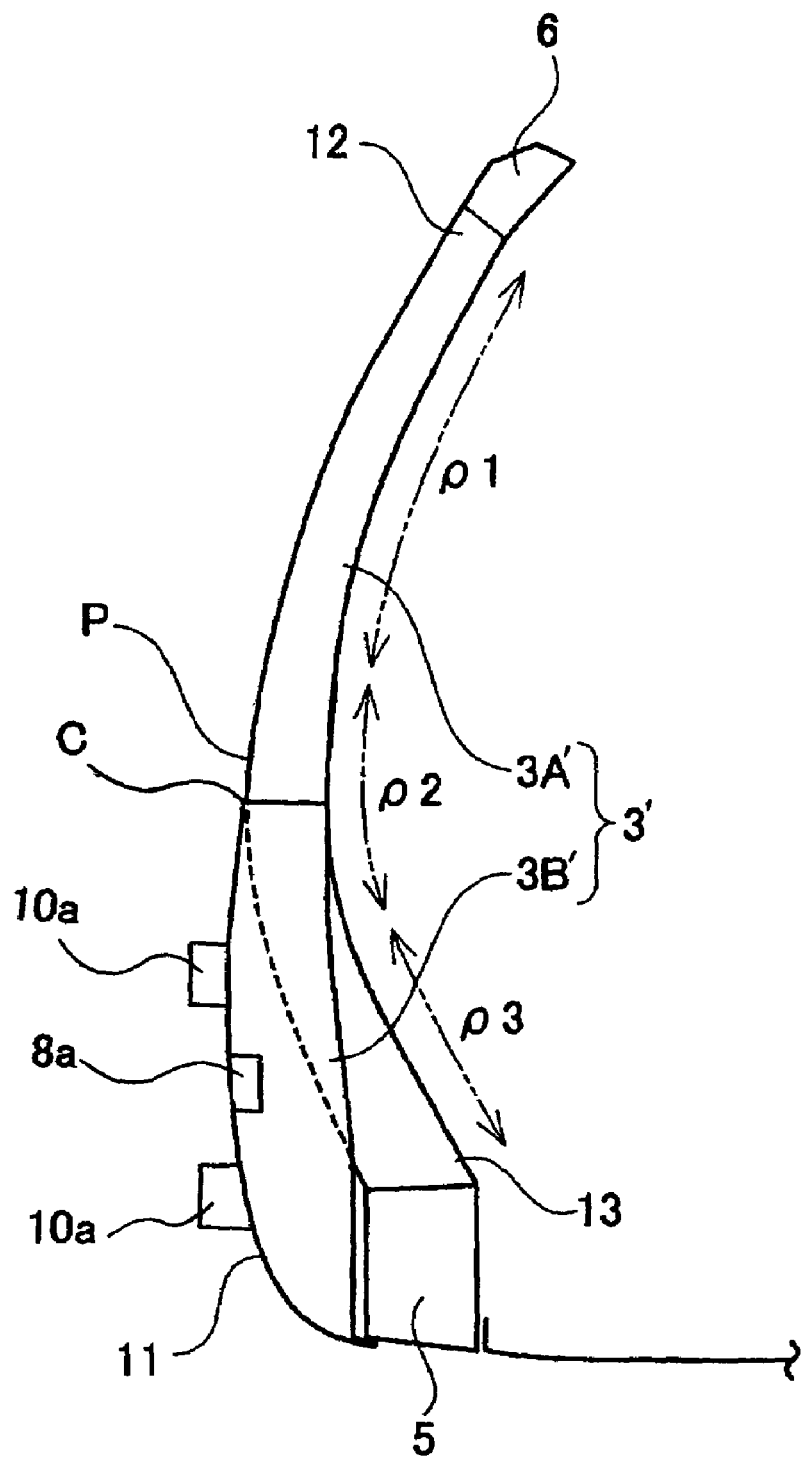
FIG. 15 is a front elevational view of an alternative configuration of a center pillar of the vehicle body side structure in accordance with the present invention.

When the coupling portion C is offset in the downward direction of the vehicle body as seen in FIG. 15, the input loads are not transmitted directly from the front door 8 and the rear door 10 to the apex portion P of the inner pillar member 3A'. As a result, the load transmission path formed by the front door 8 and the rear door 10 becomes further substantially independent of the load transmission path formed by the inner pillar member 3A'.

As used herein to describe the above embodiments, the following directional terms "forward, rearward, above, downward, vertical, horizontal, below, longitudinal and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-311086. The entire disclosure of Japanese Patent Application No. 2003-311086 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body side structure comprising:
an upper structural portion extending in a generally longitudinal direction of the vehicle body side structure;
a lower structural portion extending in a generally longitudinal direction of the vehicle body side structure;
an inner center pillar portion rigidly coupled between the upper and lower structural portions and extending in a generally vertical direction of the vehicle body side structure;
an outer center pillar portion having an upper end rigidly coupled to the inner center pillar portion at a location spaced downwardly from the upper structural portion and a lower end rigidly coupled to the lower structural portion such that the outer center pillar portion is disposed on a transversely outward side of the inner center pillar portion, the outer center pillar portion being configured and arranged to form a main energy absorbing section that is displaceable in a transverse direction of the vehicle body side structure relative to the inner center pillar portion such that after the main energy absorbing section deforms during application of a side input load, the side input load is transmitted in generally in the vertical direction along the inner center pillar portion to the upper and lower structural portions;
a front strengthening member operatively coupled to the outer center pillar portion such that the side input load is at least initially transmitted longitudinally along the front strengthening member; and
a rear strengthening member operatively coupled to the outer center pillar portion such that the side input load is at least initially transmitted longitudinally along the rear strengthening member.

2. The vehicle body side structure as recited in claim 1, wherein
the inner center pillar portion includes subordinate energy absorbing sections disposed at portions adjacent the upper and lower structural portions, respectively, such that the inner center pillar portion is configured and arranged to be displaceable in a transversely inward direction of the vehicle body side structure.

3. The vehicle body side structure as recited in claim 2, wherein
the subordinate energy absorbing section has a reaction force characteristic that is larger than a reaction force characteristic of the main energy absorbing section.

4. The vehicle body side structure as recited in claim 1, wherein
the outer center pillar portion has a generally U-shaped horizontal cross section that opens toward the transversely inward direction of the vehicle body side structure,
the outer center pillar portion being coupled to an outer surface of the inner center pillar portion to cover a portion of the inner center pillar portion and form a closed cross section between the outer center pillar portion and the inner center pillar portion, and
the outer center pillar portion extending in the transversely outward direction of the vehicle body side structure from a portion where the outer center pillar portion is coupled to the inner center pillar portion.

5. The vehicle body side structure as recited in claim 4, further comprising
a garnishing member configured and arranged to cover the transversely inward side of the inner center pillar portion.

6. The vehicle body side structure as recited in claim 4, wherein
the outer center pillar portion is made by press forming a panel material.

7. The vehicle body side structure as recited in claim 1, wherein
the inner center pillar portion has a generally convex shape in the vertical direction such that the inner center pillar portion generally curves toward the transversely outward direction of the vehicle body side structure.

8. The vehicle body side structure as recited in claim 7, wherein
the convex shape of the inner center pillar portion is defined by
an apex portion disposed is farther to the outside than other portions of the inner center pillar portion, and located approximately 400 millimeters to approximately 800 millimeters above ground level, the apex portion having a first prescribed radius of curvature;
an upper portion located above the apex portion configured to curve convexly outward with a second prescribed radius of curvature that is larger than the first prescribed radius of curvature and;
a lower portion located below the apex portion configured to curve convexly outward with a third prescribed radius of curvature that is larger than the first prescribed radius of curvature and equal to or larger than the second prescribed radius of curvature.

9. The vehicle body side structure as recited in claim 8, wherein
the outer center pillar portion is coupled to the inner center pillar portion at a location that is offset with respect to the apex portion of the inner center pillar portion in the vertical direction of the vehicle body side structure.

10. The vehicle body side structure as recited in claim 8, wherein
the outer center pillar portion is coupled to the inner center pillar portion at a location that is offset with respect to the apex portion of the inner center pillar portion in an upward direction of the vehicle body side structure toward the upper structural portion.

11. The vehicle body side structure as recited in claim 1, wherein
the front strengthening member comprises a front door having a front reinforcement member disposed in the longitudinal direction of the vehicle body side structure to increase a longitudinal strength of the front door, and
the rear strengthening member comprises a rear door having a rear reinforcement member disposed in the longitudinal direction of the vehicle body side structure to increase a longitudinal strength of the rear door.

12. The vehicle body side structure as recited in claim 11, wherein
each of the front and rear doors includes a forwardly located hinge reinforcement member and a rearwardly located lock reinforcement member,
the front reinforcement member of the front door is coupled between the hinge reinforcement member and the lock reinforcement member of the front door, and the rear reinforcement member of the rear door is coupled between the hinge reinforcement member and the lock reinforcement member of the rear door.

13. The vehicle body side structure as recited in claim 1, wherein
the lower structural portion includes a side sill extending generally in the longitudinal direction of the vehicle body side structure, and a transversely extending floor cross member coupled at one end to the side sill, and
the inner center pillar portion being connected to the lower structural portion through the floor cross member.

14. The vehicle body side structure as recited in claim 1, further comprising
an additional center pillar extending generally in the vertical direction of the vehicle body side structure, the additional center pillar comprising an inner center pillar portion and an outer center pillar portion,
a floor cross member coupling the inner center pillar portions of the center pillar and the additional center pillar together in the transverse direction of the vehicle body side structure, and
a roof cross member coupling the inner center pillar portions of the center pillar and the additional center pillar together in the transverse direction of the vehicle body side structure,
the inner center pillar portions of the center pillar and the additional center pillar being formed as generally pipe-shaped members that are made using a hydraulic forming method, the inner center pillar portions of the center pillar and the additional center pillar being coupled to the roof and floor cross members to form a single, integrated member having a substantially annular shape extending in the transverse direction of the vehicle body side structure.

15. The vehicle body side structure as recited in claim 1, wherein
the outer center pillar portion is provided with an outer pillar reinforcement member configured and arranged to support the rear end portion of the front strengthening member and the front end portion of the rear strengthening member.

16. The vehicle body side structure as recited in claim 1, wherein
the inner center pillar portion includes higher strength portions at upper and lower end portions of the inner center pillar portion where the inner center pillar portion is coupled to the lower structural portion and the upper structural portion, respectively, the higher strength portions being configured and arranged to have higher strength than other portions of the inner center pillar portion.

17. The vehicle body side structure as recited in claim 1, wherein the outer center pillar portion is made by cast molding a light alloy material.

18. The vehicle body structure as recited in claim 9, wherein
the outer center pillar portion is coupled to the inner center pillar portion at a portion that is offset with respect to the apex portion of the inner center pillar portion in a downward direction of the vehicle body side structure toward the upper structural portion.

19. The vehicle body side structure as recited in claim 1, further comprising
a front pillar rigidly coupled between the upper and lower structural portions and extending generally in the vertical direction of the vehicle body side structure with the front strengthening member operatively arranged between the front pillar and the outer center pillar portion; and
a rear pillar rigidly coupled between the upper and lower structural portions and extending generally in the vertical direction of the vehicle body side structure with the rear strengthening member operatively arranged between the rear pillar and the outer center pillar portion.

* * * * *